United States Patent

[11] 3,619,012

[72] Inventors Rejean Bizier;
 Pierre Paul Triacca, both of 829 Woodward, Sherbrooke, Quebec, Canada
[21] Appl. No. 863,592
[22] Filed Oct. 3, 1969
[45] Patented Nov. 9, 1971

[54] SNOW TRACK
 4 Claims, 6 Drawing Figs.

[52] U.S. Cl. .................................................. 305/38
[51] Int. Cl. ........................................... B62d 55/24
[50] Field of Search ................................... 305/38, 37, 35 EB; 198/193

[56] References Cited
 UNITED STATES PATENTS
2,055,932  9/1936  Kitchen ...................... 305/35 EB
2,416,679  3/1947  Curtis .......................... 305/34
3,311,424  3/1967  Taylor ......................... 305/35 EB
3,451,729  6/1969  Roy ............................. 305/38

FOREIGN PATENTS
678,766  1/1964  Canada ....................... 305/34

Primary Examiner—Richard J. Johnson
Attorney—Raymond A. Robic

ABSTRACT: The commonly known endless track for snow vehicle of the type comprising a single continuous belt of rubber material to wind around one or a pair of spaced apart sprocket wheels when provided with the required sprocket-tooth apertures is improved by providing means to define a transverse outer convex shape in the belt, and these means are resiliently deformable to provide a substantially flat running and bearing surface for the snow vehicle when the same is loaded.

PATENTED NOV 9 1971 3,619,012

INVENTORS
Rejean BIZIER
Pierre-Paul TRIACCA

BY
Raymond *A. Robic*
ATTORNEY

SNOW TRACK

This invention relates to a snow track. More particularly, the invention is directed to an endless track for snow vehicle particularly intended for use on small snow vehicles of the type generally referred to as motorized sleighs.

The tracks for these vehicles are commonly made of rubber and are usually power driven by means of a series of sprocket wheels. It is also common to provide stiffeners across the transverse distance between the sprocket wheels positions, such stiffeners being usually in the form of transversely disposed stiff metal rods or blades embedded in the rubber belts and spaced apart by a distance equivalent to the interval between consecutive teeth of the sprockets or a small multiple thereof.

It has been found that the tracks of the prior art though very convenient for use in heavy snow do not possess enough versatility on packed snow where a better control, maneuverability and traction is desired. As a matter of fact, when circulating over highly packed snow, it has been found that these little snow vehicles do not possess the versatility required, especially in cornering at high speed and ascending steep hills.

In order to overcome the above disadvantages, the commonly known endless track for snow vehicle of the type comprising a single continuous belt of rubber material to wind around a pair of spaced apart sprocket wheels when provided with the required sprocket tooth apertures can be considerably improved by providing means to define a transverse outer convex shape in the belt, wherein these means are resiliently deformable to provide a substantially flat running and bearing surface for the snow vehicle when the same is loaded.

The convex shape in the belt may vary at will and according to circumstances. For instance, it may be curved as an arc of a circle, the convex shape may be polygonal, with the number of sides required, or it may also comprise curved portions and straight or polygonal portions.

Obviously, the endless track of the invention must possess snow-gripping means and according to a preferred embodiment of the invention, these may be formed with two rows of transversal ribs each formed between a longitudinal row of toothed apertures and a corresponding outer edge of the belt, and in addition two rows of ribs, each formed on either side of the central longitudinal axis of the belt, and which extend to a corresponding longitudinal row of toothed apertures, with the further characteristic that the ribs of both rows are oppositely inclined with respect to the central longitudinal axis of the belt.

The sprocket tooth apertures are usually separated by rubber-bridging portions and in accordance with the invention, metal wear clips are wrapped around and protectively cover the rubber bridging portions.

In accordance with another embodiment of the invention, the resilient means defining a transverse convex outer face of the rubber belt, comprise thin resilient curved metal blades transversely embedded in the rubber belt, and positioned in the neutral plane of the belt to be aligned with every other pair of oppositely disposed rubber bridging portions.

IN THE DRAWINGS WHICH ILLUSTRATE THE INVENTION

Figure 4:
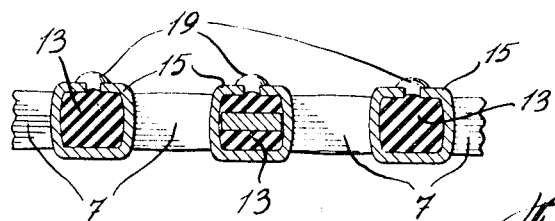
FIG. 4 is a section taken along line 4—4 of FIG. 2.

Referring to the drawings, the endless track according to the invention comprises a traction belt 1 provided with two longitudinal rows 3 and 5 of rectangularly shaped sprocket-tooth apertures 7. It will be understood that the latter are adapted to receive the teeth 9 (FIG. 6) of the pair of sprocket wheels 11 the latter being provided on the snow vehicle (not shown). The sprocket-tooth apertures 7 are separated by the rubber-bridging portions 13 which are better illustrated in FIG. 4 of the drawings.

As usual, the rubber-bridging portions 13 are protectively covered with the wrapped around metal wear clips 15 of standard construction.

Figure 1:
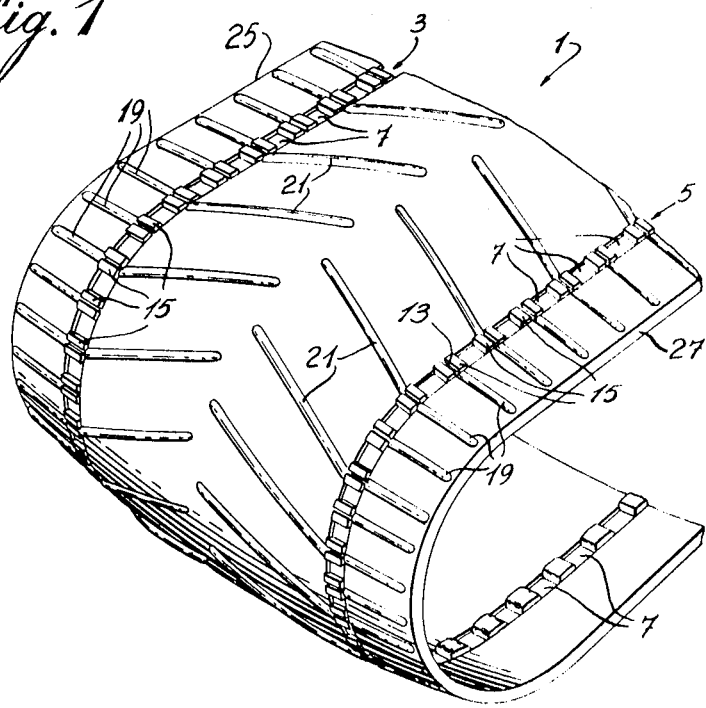
FIG. 1 is a partial perspective view of the endless track according to the invention.
Figure 2:
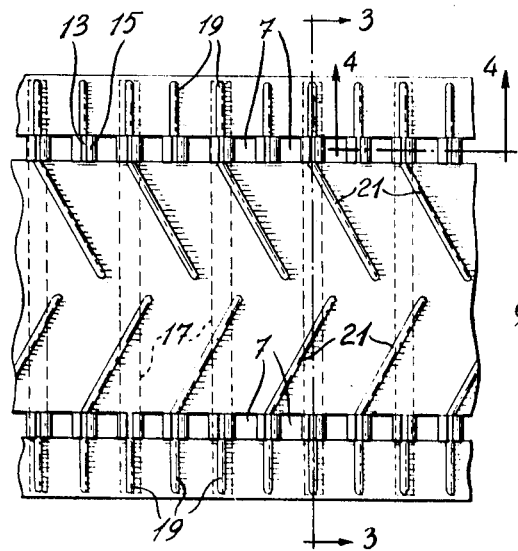
FIG. 2 is a partial top plan view of the endless track according to the invention.
Figure 3:
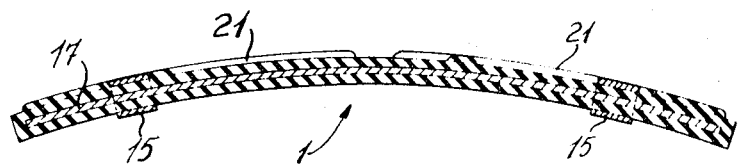
FIG. 3 is a section taken along line 3—3 of FIG. 2.

In order to define a transverse convex shape of the outer face of the traction belt 1, there are provided a plurality of thin resilient curved metal blades 17, preferably spring steel blades, which are transversely embedded within the material of the belt 1. It will be realized that the position of the blades 17 within the material of the belt 1 is preferably at the neutral plane of the belt as particularly illustrated in FIG. 3 of the drawings. Furthermore, in the embodiment illustrated in the drawings, there are provided a number of metal blades to be aligned with every other pair of oppositely disposed rubber-bridging portions 13. Obviously, the metal blades do not necessarily have to be curved in the manner illustrated in FIG. 3. For example, these blades may be polygonal or they may also be partly curved and partly straight or polygonal.

For a good traction and excellent control of the snow vehicle provided with the endless track of the invention, the belt should be provided with the transversal ribs 19 and inclined ribs 21. The two rows of transversal ribs 19, are each formed between a longitudinal row of tooth apertures 3 or 5 and a corresponding outer edge 25 or 27 of the belt 1.

The ribs 21 are formed on either side of the central longitudinal axis of the belt to form two rows of inclined ribs. It will be noted that the ribs 21 extend from the central longitudinal axis of the belt to a corresponding longitudinal row of tooth apertures 3 or 5 and that the ribs of both rows 21 are oppositely inclined with respect to the central longitudinal axis of the belt.

The exact inclination of the ribs 21 is not critical. However, it should be determined having in mind that it is especially useful in cornering if the force of traction is substantially perpendicular to the ribs 21. Consequently, if the vehicle is to be used for fast cornering, the inclination should be more pronounced and vice versa.

Figure 5:
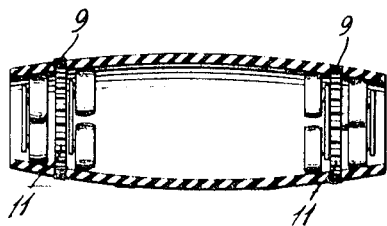
FIG. 5 is a section view of the track according to the invention when mounted on an unloaded vehicle.
Figure 6:
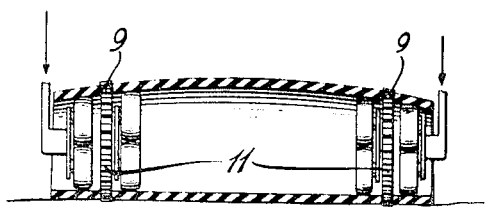
FIG. 6 is a section view of the track according to the invention when mounted on a loaded vehicle.

Referring to FIGS. 5 and 6, there are illustrated in FIG. 5 an endless track when mounted on an unloaded vehicle and in FIG. 6, the same track when mounted on a loaded vehicle. It will be seen that when loaded, the outer surface of the belt 1 will completely adhere to the surface of the snow. However, it will easily be understood that the highest pressure will be exerted in the vicinity of the central longitudinal axis of the belt to provide a better traction when climbing steep hills. When cornering, it will be seen that the outer side of the belt will easily lose contact with the surface of the snow while the inner side remains firmly in contact therewith. In this manner, fast and sharp cornering is much more easily performed.

It may be desirable and, in some cases it is preferred, to have only one sprocket wheel to drive the belt, and in this case there is only one row of sprocket tooth apertures which is located to correspond with the central longitudinal axis of the belt.

We claim:

1. In an endless track for snow vehicle, said endless track of the type comprising a single continuous belt of rubber material, said continuous belt to wind around a pair of spaced apart wheels and wherein the belt comprises two longitudinal rows of sprocket tooth apertures to respectively engage the teeth of the sprocket wheel, said belt provided on the outer face thereof with snow-gripping means solid with the material of the belt, the improvement which comprises thin resilient longitudinal curved blades transversely embedded in said rubber belt in the neutral plane thereof to define a transverse outer convex shape in said belt, said blades deformable to provide a substantially flat running and bearing surface for said snow vehicle when the same is loaded.

2. An endless track as claimed in claim 1, wherein said snow-gripping means comprise two rows of transversal ribs each formed between a longitudinal row of tooth apertures and a corresponding outer edge of said belt and two additional rows of ribs each formed on either side of said central longitudinal axis of said belt and extending to a corresponding longitudinal row of tooth apertures, the ribs of both additional rows oppositely inclined with respect to the central longitudinal axis of said track.

3. An endless track as claimed in claim 2, wherein said sprocket tooth apertures are separated by rubber-bridging portions, and further comprising metal wear clips wrapped around and protectively covering said rubber-bridging portions.

4. An endless track for snow vehicle, said endless track of the type each comprising a single continuous belt of rubber material, said continuous belt to wind around a pair of spaced apart sprocket wheels, said continuous belt comprising:
   a. two longitudinal rows of sprocket-tooth apertures, formed near the edges of said belt to respectively engage the teeth of the sprocket wheels;
   b. said sprocket tooth apertures separated by rubber-bridging portions;
   c. metal wear clips wrapped around and protectively covering said rubber-bridging portions;
   d. thin resilient curved metal blades transversely embedded in said rubber belt, said metal blades positioned in the neutral plane of said belt to be aligned with every other pair of oppositely disposed rubber-bridging portions, said metal blades defining a transverse curved shape in said belt but deformable to provide a substantially flat running and bearing surface for said snow vehicle when the same is loaded;
   e. two rows of transversal ribs each formed between a longitudinal row of tooth apertures and a corresponding outer edge of said belt; and
   f. two additional rows of ribs each formed on either side of the central longitudinal axis of the belt and extending to a corresponding longitudinal row of tooth apertures, the ribs of both additional rows oppositely inclined with respect to the central longitudinal axis of the belt.

* * * * *